United States Patent Office 2,935,378
Patented May 3, 1960

2,935,378
HYDRAZINE MANUFACTURE

William D. Schaeffer, Pomona, Calif., assignor to Union Oil Company of California, Los Angeles, Calif., a corporation of California No Drawing. Application July 29, 1957
Serial No. 674,580

4 Claims. (Cl. 23—190)

This invention relates to new methods for preparing hydrazine, and for preparing an intermediate therefor, viz., hydroxylamine-O-sulfonic acid. Broadly, the method comprises reacting a salt of hydroxylamine-O-sulfonic acid with ammonia under anhydrous conditions to effect ammonolysis, as follows:

(1) $(NH_2OSO_3H) \cdot HX + 4NH_3$
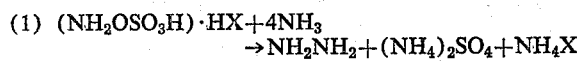
$\rightarrow NH_2NH_2 + (NH_4)_2SO_4 + NH_4X$ The HX salt of hydroxylamine-O-sulfonic acid is preferably prepared by reacting the HX salt of hydroxylamine with sulfur trioxide under anhydrous conditions:

(2) $(NH_2OH) \cdot HX + SO_3 \rightarrow (NH_2OSO_3H) \cdot HX$

Hydrazine has become increasingly important in recent years as an intermediate in the manufacture of various chemicals, and as a rocket propellant. Methods are known in the art for producing hydrazine from ammonia through the use of various reagents. The most important methods involve reacting either ammonia or urea with an oxidizing agent such as sodium hypochlorite:

(3) $2NH_3 + NaOCl \rightarrow NH_2NH_2 + NaCl + H_2O$ (4) $NH_2CONH_2 + NaOCl + 2NaOH$
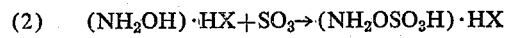
$\rightarrow NH_2NH_2 + NaCl + Na_2CO_3 + H_2O$ Both of these methods suffer from the disadvantage that sodium hypochlorite is capable of oxidizing the product hydrazine to nitrogen and ammonia, resulting in low yields. Another disadvantage is that both processes must be carried out in dilute aqueous solution because of the hazard involved in handling unstable nitrogen substituted chloro intermediates. This results in expensive handling problems, and serious difficulties in the isolation of the product hydrazine.

Other prior art procedures are known whereby hydrazine is produced directly from ammonia by pyrolysis, radiation activation, or the like. However, these procedures are generally characterized by such low yields that they are not commercially feasible.

It is an object of this invention to provide a method for producing hydrazine in substantially quantitative yields. Another object is to prevent the decomposition of hydrazine once it is formed. Still another object is to provide a process whereby hydrazine may be easily isolated from by-products and excess reactants. A further object is to provide safe methods for producing hydrazine in the absence of large volumes of diluent. Still another object is to provide economical and convenient methods for preparing the intermediate salts of hydroxylamine-O-sulfonic acid. Other objects will be apparent from the more detailed description which follows.

According to the present invention, hydrazine may be formed in a simple manner by reacting substantially stoichiometric proportions of a suitable salt of hydroxylamine-O-sulfonic acid with ammonia under anhydrous conditions. According to one modification, the reaction is conducted in an excess of liquid ammonia at temperatures ranging anywhere between about −77° C. and +132° C., the latter figure being the critical temperature for ammonia. Pressures ranging anywhere between atmospheric and about 200 atmospheres may be employed. In view of the ease of recovery of excess ammonia, it is preferred to operate with a 0.1 to 10 molar excess of ammonia, whereby all of the hydroxylamine-O-sulfonic acid salt is reacted. According to a preferred mode of operation, the solid salt of hydroxylamine-O-sulfonic acid is gradually stirred into the excess of liquid ammonia. The reaction is slightly exothermic, and hence appropriate cooling procedures may be employed. Preferred temperatures for the reaction fall within the range of about −10° C. to about 50° C.

During the reaction, hydrazine is formed substantially quantitatively and remains dissolved in the excess liquid ammonia. The sulfonic acid moiety of the hydroxylamine-O-sulfonic acid salt reacts with ammonia to produce ammonium sulfate which precipitates in large part from the solution. The N-bonded acid moiety of the hydroxylamine-O-sulfonic acid salt is also neutralized by the ammonia and forms the corresponding ammonium salt. When the reaction has proceeded to the desired extent, the solid salts may be removed by filtration, decantation, centrifuging, or the like and the remaining liquid is then subjected to distillation to recover excess ammonia. Substantially pure hydrazine boiling at 113.5° C. remains as residue.

Any stable acid salt of hydroxylamine-O-sulfonic acid may be employed. In most cases, it will be found preferable to employ the sulfuric acid salt, whereby a single by-product salt will be produced, namely ammonium sulfate. However, other acid salts may be employed, e.g. the hydrobromide, hydroiodide, hydrofluoride, nitrate, phosphate, formate, acetate, oxalate, benzoate, and the like. Where salts other than the sulfates are employed, it will be understood that the reaction with ammonia will produce a mixture of two salts, which may then be separated by conventional methods if desired.

As indicated, the yields of hydrazine are substantially theoretical, and for practical purposes will range between about 90% and 100%, based on the hydroxylamine-O-sulfonic acid.

It is not essential that liquid ammonia be employed in the process. If desired, the acid salt of hydroxylamine-O-sulfonic acid may simply be contacted with gaseous ammonia at any desired temperature, e.g. 0° to 250° C. This method is advantageous in that, at reaction temperatures above about 113.5° C., the hydrazine produced may be continuously removed from the reaction zone, and the passage of ammonia through the hydroxylamine-O-sulfonic acid salt can be continued until the latter is substantially exhausted. When this stage is reached, the solid residue will consist of ammonium sulfate and the ammonium salt of the N-bonded acid moiety of the hydroxylamine-O-sulfonic acid salt. It is contemplated that the by-product ammonium sulfate will be suitable as recovered for use as a fertilizer, or in the chemical industries.

Methods for producing suitable acid salts of hydroxylamine-O-sulfonic acid are known in the art. For example, hydroxylamine sulfate may be reacted with chlorosulfonic acid to yield the sulfate of hydroxylamine-O-sulfonic acid in quantitative yields, plus by-product hydrogen chloride. For purposes of this invention a preferred method of making the hydroxylamine-O-sulfonic acid salt is to react the desired hydroxylamine salt, e.g. the sulfate, with sulfur trioxide. This method has the advantage of producing no by-products, and the total reaction product may hence be used directly in the hydrazine manufacture step. In one modification, the sulfur trioxide may be dissolved in excess liquid sulfur dioxide, and the hydroxylamine salt gradually stirred into the mixture. The reaction is slightly exothermic, and appropriate cooling will hence be employed. This reaction is also carried out under anhydrous conditions, and suitable temperatures may range between about —73° and +157° C. The yield of hydroxylamine-O-sulfonic acid salt is substantially quantitative. After completion of the reaction, the liquid sulfur dioxide may be removed by evaporation, and the total residue treated directly with ammonia as above described.

In another modification, the sulfur dioxide solution of the hydroxylamine-O-sulfonic acid salt may be reacted directly with ammonia, since under anhydrous conditions sulfur dioxide does not react with ammonia or hydrazine. In any case it is preferred that no excess sulfur trioxide be carried over to the hydrazine production stage since sulfur trioxide is a strong oxidizing agent which may oxidize part of the hydrazine.

Any of the foregoing reactions with ammonia or with sulfur trioxide may be carried out in the presence of other inert diluents, solvents, thinners, or the like. Examples of such extenders include for example paraffins, halogenated paraffins, chloroform, diethyl ether, and the like. The following examples are cited as illustrative, but are not intended to be limiting in scope.

Example I

About 640 ml. of liquid ammonia is placed in a 3-liter stainless steel bomb equipped with an overhead pressure relief valve and a lock-chamber feeder. About 324 gms. (1 mole) of hydroxylamine-O-sulfonic acid sulfate, $(NH_2OSO_3H)_2 \cdot H_2SO_4$, is placed in the feeder and is admitted to the bomb in 20 gm. increments via the lock chamber over a period of about 1 hour. The bomb is rocked gently at about 25° C. during the reaction period, and internal cooling is maintained by releasing gaseous ammonia via the pressure relief valve. At the end of the reaction period, excess ammonia is distilled off, and then the hydrazine (B.P. 113.5° C.) is distilled off and condensed. About 62 gms. of pure hydrazine is recovered (97% yield). The residue in the bomb is substantially pure ammonium sulfate.

Example II

A steam-jacketed tubular reactor is packed with 324 gms. of hydroxylamine-O-sulfonic acid sulfate. With the reactor maintained at a temperature of about 125° C., gaseous ammonia is passed upwardly through the hydroxylamine-O-sulfonic acid sulfate at a rate sufficient to maintain a gas-phase residence time of about 2 seconds. Product gases are withdrawn at the top of the reactor and passed through a Dry Ice condenser. This is continued until a potassium iodide indicator in the product gas stream indicates that no more hydrazine is being generated. The liquid product is then fractionated to recover unreacted ammonia. The residue consists of about 63 grams of pure hydrazine (98.5% yield). The solid residue in the reactor is substantially pure ammonium sulfate.

Example III

The hydroxylamine-O-sulfonic acid sulfate of the foregoing examples is conveniently prepared as follows:

About 164 grams (1 mole) of hydroxylamine sulfate, $(NH_2OH)_2 \cdot H_2SO_4$, is dissolved in 300 ml. of liquid sulfur dioxide at —15° C. A second solution of about 85 grams of sulfur trioxide in 100 ml. of liquid sulfur dioxide is prepared. While maintaining the temperature at —15° C., the second solution is added gradually with stirring to the first solution over a period of about 20 minutes. After the addition is complete, the mixture is then distilled over the temperature range of —10° to +50° C. to recover sulfur dioxide and the small excess of sulfur trioxide. The solid residue is substantially pure hydroxylamine-O-sulfonic acid sulfate, and the yield is substantially 100%.

Substantially the same results are obtained when the hydroxylamine sulfate is added gradually with stirring to a solution of 85 grams of sulfur trioxide dissolved in 400 ml. of sulfur dioxide.

Care must be exercised in carrying out the process of this invention, to avoid contacting the hydrazine formed with the hydroxylamine-O-sulfonic acid in concentrated form, or alternatively to remove the hydrazine substantially as rapidly as it is formed from contact with the O-sulfonic acid. This is to avoid oxidation of the hydrazine by the O-sulfonic acid, which may sometimes proceed with explosive violence. Thus, when using liquid ammonia, a large excess is employed, and the excess is not removed until essentially all of the O-sulfonic acid is reacted; in the vapor phase process, the hydrazine is preferably vaporized and removed substantially as soon as it is formed.

From the foregoing it will be apparent that the process of this invention is a remarkably efficient and facile method for producing hydrazine and avoids the major objections to previously known processes. The foregoing description is not intended to be limiting in scope except where indicated. The true scope of the invention is intended to be embraced by the terms of the following claims.

I claim:

1. A process for preparing hydrazine which comprises contacting ammonia with an acid salt of hydroxylamine-O-sulfonic acid under anhydrous conditions and at a temperature between about —77° and 250° C. and recovering hydrazine from the reaction products.

2. A process as defined in claim 1 wherein said acid salt of hydroxylamine-O-sulfonic acid is the sulfate salt.

3. A process for preparing hydrazine which comprises adding an acid salt of hydroxylamine-O-sulfonic acid to an excess of liquid ammonia, and allowing the reaction to proceed under anhydrous conditions at a temperature between about —77° and 132° C. until substantially all of said hydroxylamine-O-sulfonic acid is consumed, and then recovering hydrazine from the reaction products.

4. A process for preparing hydrazine which comprises passing gaseous ammonia under anhydrous conditions through a mass of an acid salt of hydroxylamine-O-sulfonic acid at a temperature between about 113.5° and 250° C. and recovering hydrazine from the effluent vapors.

References Cited in the file of this patent

UNITED STATES PATENTS

| | | |
|---|---|---|
| 2,268,443 | Crowder | Dec. 30, 1941 |
| 2,458,404 | Nagle | Jan. 4, 1949 |
| 2,677,599 | Zeegers | May 4, 1954 |
| 2,717,200 | Hanford | Sept. 6, 1955 |
| 2,749,217 | Deutschman | June 5, 1956 |

OTHER REFERENCES

Mellor: "A Comprehensive Treatise on Inorganic and Theoretical Chemistry," Longmans, Green and Co., N.Y., vol. 8, 1928, p. 670.

Specht, Browne and Sherk: "Formation of Aminomonopersulfuric Acid by the Interaction of Fuming Sulfuric Acid and Hydrogen Azide," Journal of the American Chemical Society, vol. 61, 1939, pages 1083–1086.